(12) United States Patent
Schmitt et al.

(10) Patent No.: US 11,340,964 B2
(45) Date of Patent: May 24, 2022

(54) SYSTEMS AND METHODS FOR EFFICIENT MANAGEMENT OF ADVANCED FUNCTIONS IN SOFTWARE DEFINED STORAGE SYSTEMS

(71) Applicant: INTERNATIONAL BUSINESS MACHINES CORPORATION, Armonk, NY (US)

(72) Inventors: Christof Schmitt, Tucson, AZ (US); Erik Rueger, Ockenheim (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/422,663

(22) Filed: May 24, 2019

(65) Prior Publication Data
US 2020/0371849 A1    Nov. 26, 2020

(51) Int. Cl.
G06F 9/54 (2006.01)
G06F 21/56 (2013.01)
G06F 16/22 (2019.01)
G06F 16/23 (2019.01)

(52) U.S. Cl.
CPC .............. *G06F 9/542* (2013.01); *G06F 16/22* (2019.01); *G06F 16/2358* (2019.01); *G06F 21/562* (2013.01); *G06F 2221/034* (2013.01)

(58) Field of Classification Search
CPC .... G06F 9/542; G06F 16/2358; G06F 21/562; G06F 16/22; G06F 2221/034
See application file for complete search history.

(56) References Cited

U.S. PATENT DOCUMENTS

| | | | |
|---|---|---|---|
| 8,065,365 B2* | 11/2011 | Saxena | G06Q 10/02 709/204 |
| 8,255,425 B1* | 8/2012 | Li | G06F 16/1734 707/802 |
| 9,460,399 B1* | 10/2016 | Stacey | G06F 9/46 |
| 10,652,080 B2* | 5/2020 | Golin | H04L 41/0672 |
| 10,970,139 B2* | 4/2021 | Marchiori | G06F 9/542 |
| 2003/0093509 A1* | 5/2003 | Li | H04L 41/0213 709/223 |

(Continued)

OTHER PUBLICATIONS

Luo, S., et al., "Orchestration of Software-Defined Security Services," IEEE ICC2016—Workshops: W11—Workshop on Orchestration for Software-Defined Infrastructures (O4SDI), © 2016 IEEE, 6 pp.

*Primary Examiner* — Doon Y Chow
*Assistant Examiner* — Phuong N Hoang
(74) *Attorney, Agent, or Firm* — Konrad Raynes Davda & Victor LLP; David W. Victor (57) ABSTRACT

Provided are a computer program product, system, and method for efficient management of advanced functions in software defined storage systems. A data manager is provided that allows processes performing network functions to register to receive event notifications when another process performs a function causing a network event. A process that completes a network function causing a network event notifies the data manager that the network event occurred. The data manager uses a registration database to determine the processes to receive an event notification of the event and a transmits an event notification to the determined processes.

23 Claims, 9 Drawing Sheets

(56) References Cited

U.S. PATENT DOCUMENTS

| | | | | |
|---|---|---|---|---|
| 2003/0154271 A1* | 8/2003 | Baldwin | ............... | G06F 3/0601 |
| | | | | 709/223 |
| 2005/0257085 A1* | 11/2005 | Haustein | ............. | G06F 11/1458 |
| | | | | 714/13 |
| 2007/0271612 A1* | 11/2007 | Fang | ..................... | G06F 21/567 |
| | | | | 726/22 |
| 2008/0134335 A1* | 6/2008 | Kameda | ................. | G06F 21/56 |
| | | | | 726/24 |
| 2013/0185800 A1* | 7/2013 | Miller | ................... | G06F 21/568 |
| | | | | 726/24 |
| 2014/0259168 A1* | 9/2014 | McNamee | ............ | H04L 63/145 |
| | | | | 726/23 |
| 2014/0304309 A1* | 10/2014 | Diederich | .............. | G06F 16/113 |
| | | | | 707/812 |
| 2015/0317556 A1* | 11/2015 | Huang | ................... | H04L 67/34 |
| | | | | 706/23 |
| 2016/0366184 A1 | 12/2016 | Luo et al. | | |
| 2017/0337377 A1* | 11/2017 | Vlaznev | ................ | G06F 21/567 |
| 2018/0083985 A1* | 3/2018 | Ahuja | ................. | H04L 63/1408 |
| 2018/0288099 A1 | 10/2018 | Rubakha et al. | | |

* cited by examiner

| | Event | Process | Network Node | Criteria |
|---|---|---|---|---|
| 310 | New/Changed | Antivirus Scan | Any Node | Lowest CPU Load |
| 311 | Scan Complete | Replication Service | Cluster Node 4 or 5 | Lowest Network Utilization |
| 312 | Scan Complete | Backup Service | Cluster Node 5 or 6 | Lowest Network Utilization |
| 313 | Backup Complete | Hierarchial Storage Management | Cluster Node 7 or 8 | Lowest Network Utilization |

SYSTEMS AND METHODS FOR EFFICIENT MANAGEMENT OF ADVANCED FUNCTIONS IN SOFTWARE DEFINED STORAGE SYSTEMS

BACKGROUND OF THE INVENTION

1. Field of the Invention

The present invention relates to a computer program product, system, and method for efficient management of advanced functions in software designed storage systems.

2. Description of the Related Art

Software Defined Storage Systems (SDSS) are storage system in which software abstracts the storage hierarchy from underlying hardware resources. SDSS systems are commonly used to allow a storage system to be scaled the storage requirements of particular system. As the use of SDSSs has increased, SDSS have begun to increasingly offer advanced network functions like antivirus scan integration, backup integration and replication of the data to a remote system. Each of those functions can usually run in two modes: Either from a periodically triggered scan across all files, or from being notified of a change in the file system.

3. Summary

Provided are a computer program product, system, and method for managing notifications between processes providing functions in a data storage system. A database is maintained that stores event associations between processes, event types, and notifications to receive based on event types. Each event association provides an indication a process, an event type, and an event notification in response to an event.

A notification of an event occurring in the data storage system is received from a first process. In response to receiving the notification, a second process to receive an event notification in response to the event is determined from the database. An event notification to send to the second process is determined from the database and the determined event notification is transmitted to the second process.

DETAILED DESCRIPTION

As discussed, SDSSs increasingly offer advanced network functions like antivirus scan integration, backup integration and replication of the data to a remote system. As the use of SDSSs has increased, SDSS have begun to increasingly offer advanced network functions like antivirus scan integration, backup integration and replication of the data to a remote system. Each of those functions can usually run in two modes: Either from a periodically triggered scan across all files, or from being notified of a change in the file system. When using more than one of these features, unwanted interactions can result.

For example, a new file is backed up or replicated before being scanned for viruses. A subsequent virus scan detects malware and flags the file to be quarantined. This results in a new backup file being generated due to the changed flag or an invalidation of the backup if there is a policy to not backup malware files.

The same consideration applies for replication. Namely, replicating a file first, then detecting malware and flagging the file may trigger a second replication of the file. Another scenario is the creation of a file which triggers the antivirus scan, backup or replication and modifying the file a short time later, thus requiring a new scan, backup and replication while the performance of these processes on the original file might not even have finished. For services running a scheduled scan across all data, yet another question is how to schedule the run of the scan. The scans could run sequentially to minimize the impact on the cluster at the cost of a longer run time, or they could run parallel operations to reduce the overall run time, but at the cost of a higher utilization of the storage system. For scale-out systems that run on multiple hardware nodes, a related problem would be scheduling the run depending on available resources on each node.

Described embodiments provide techniques to communicate between processes providing the advance functions. With the described embodiments, the processes may schedule provision of the network functions to reduce the amount of unfavorable interactions between the processes that may waste network resources and generate unwanted data.

Described embodiments improve the computer technology for scheduling provision of network functions to prevent unfavorable interactions from occurring by providing a data manager. The data manager is a system that allows other processes providing network functions to register with the data manager to receive notifications of events that occur in the storage system. The data manager maintains a database of registered processes. The registration database stores information of the processes registered including, but not limited to, an identity of the process, network components that provide the process, events for which notifications are to be received, and criteria for selecting the network component to receive event notifications. The data manager then receives notifications when network events occur; determines processes to receive event notifications that the event occurred and the network component providing each process to receive the notification using the database; and transmits the event notification to each determined process on the determined network components.

When a process on a network receives an event notification, the process determines the piece of data associated with the event notification and performs a second network function on the piece of data. The above and other features of the described embodiments are described below with reference to the drawings.

Figure 1:
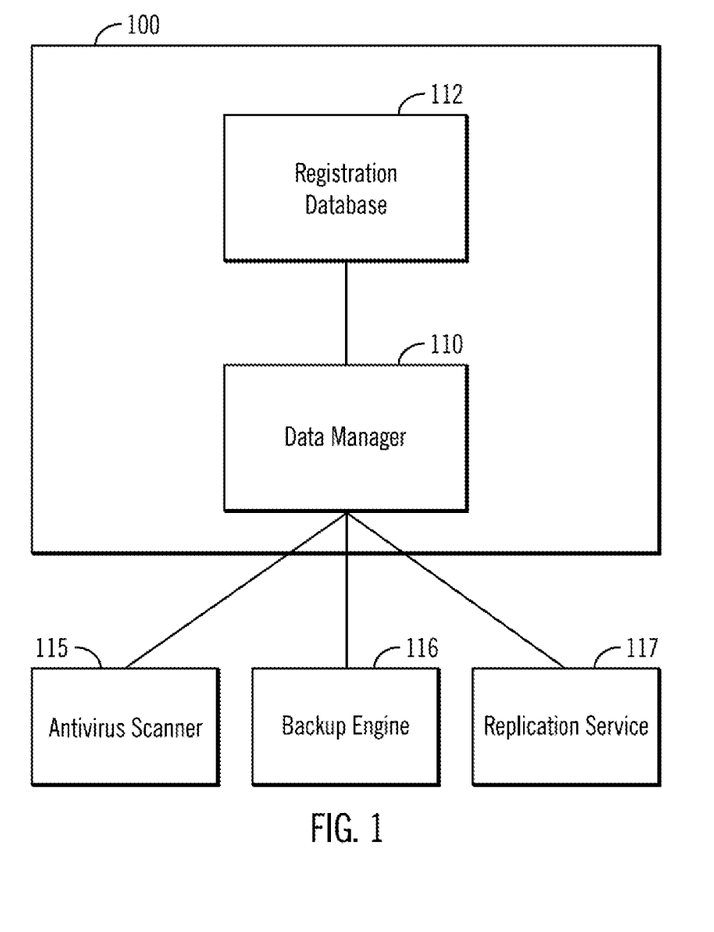
FIG. 1 conceptually illustrates an embodiment of a data manager communicating with registered processes that provide network functions.

FIG. 1 conceptually illustrates an embodiment of a data manager 110 being executed on node 100 of a storage system. In some other embodiments, the data manager 110 may be distributed over one or more nodes of the storage system. The data manager 110 maintains a registration database 112 that stores information about processes registered to receive event notifications. In the shown embodiment, the registration database 112 is shown as being maintained on node 100. However, the registration database 112 may be stored on another node and/or distributed across multiple nodes.

Processes 115-117 are processes that perform network functions that are executed on one or more nodes of the system. For example, process 115 provides an antivirus scanner, process 116 provides a backup engine, and process 117 provides a replication service for the data storage network. Other processes that provide other similar network functions can also communicate with the data manager 110 in accordance with various other embodiments of the disclosure. Process 115-117 communicate with the data manager 110 to send notification of when events occur and to receive an event notification when event of interest occurs in the network.

FIG. 1 conceptually illustrates the relationships between to the processes providing network functions and a data manager. However, processes 115-117 and data manager 110 may be configured to communicate in other manner in other embodiments.

Figure 2:
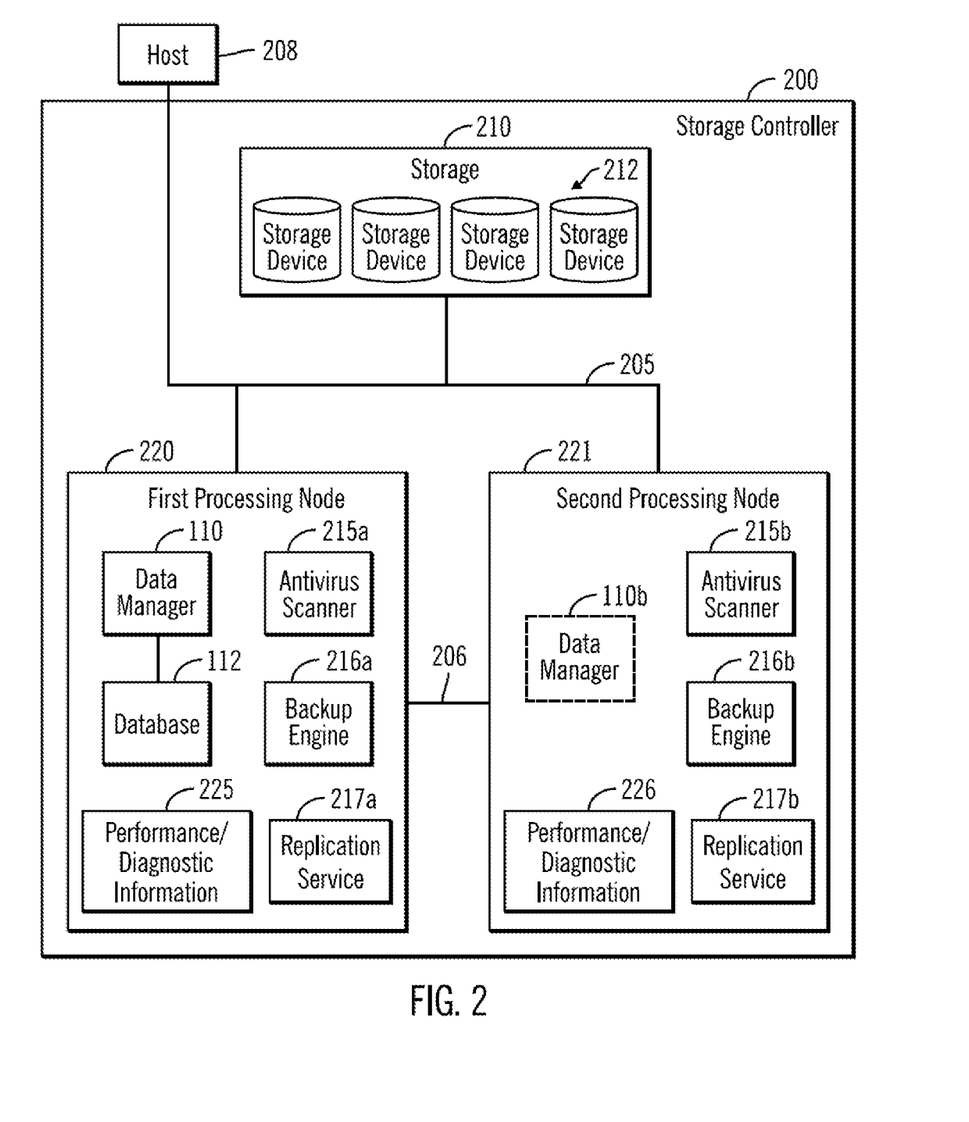
FIG. 2 illustrates an embodiment of a storage system.

FIG. 2 illustrates a storage controller 200 of an SDSS. FIG. 2 is for illustrative purposes only and some components of the SDSS are omitted for clarity and brevity. The storage controller 200 is connected to a host device 208 that accesses SDSS to store and retrieve data. Although one host device 208 is shown, it is possible for two or more host devices to the storage controller 200 of the SDSS in other embodiments. Storage controller 200 includes an array of independent network nodes 220 and 221, such as a central electronics complex (CEC), that each connect to a bus interface 205, such as a Peripheral Component Interconnect Express (PCIe) bus to communicate with a storage array 210. The network nodes 220 and 221 may also communicate with each other directly over a link 206, such as a PCIe bus. Although two network nodes 220 and 221 are shown it is possible to have any number of processes in the described embodiment. Host systems, such as host 108, may connect to the storage controller 200 through via bus interface 105. A storage array 210 includes a plurality of storage devices 212 in which logical volumes and tracks are configured. The network nodes 220 and 221 communicate with the storage array 210 to read data from and write data to the storage devices 212.

Each network node 220 and 221 executes software instructions to perform processes that perform network functions. As shown, network node 220 provides a data manager 110 that maintains registration database 112. Processing node 220 also provides antivirus scanner 215a, backup engine 216a, and replication service 217a. The network node 221 provides antivirus scanner 215b, a backup engine 216b, and a replication service 217b. In some embodiments, the data manager 110 may be a distributed process being provided on both nodes 220 and 221. In addition, each network node 220 and 221 maintains current diagnostic and/or performance information 225, 226 for the node that may stored in a memory on a node or transmitted to other network components/nodes for use. Diagnostic and/or performance information includes metrics of various components of the nodes including, but not limited to, a current CPU load, an amount of memory that is currently used, and amount of memory that is currently free.

The storage controller 200 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world).

The storage devices 212 in the storage array 210 may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Volumes in a storage space may further be configured from an array of devices, such as Just a Bunch of Disks (JBOD), Direct Access Storage Device (DASD), Redundant Array of Independent Disks (RAID) array, virtualization device, etc. Further, the storage devices 212 in the storage array 210 may comprise heterogeneous storage devices from different vendors and different types of storage devices, such as a first type of storage devices, e.g., hard disk drives, that have a slower data transfer rate than a second type of storage devices, e.g., SSDs.

Figure 3:
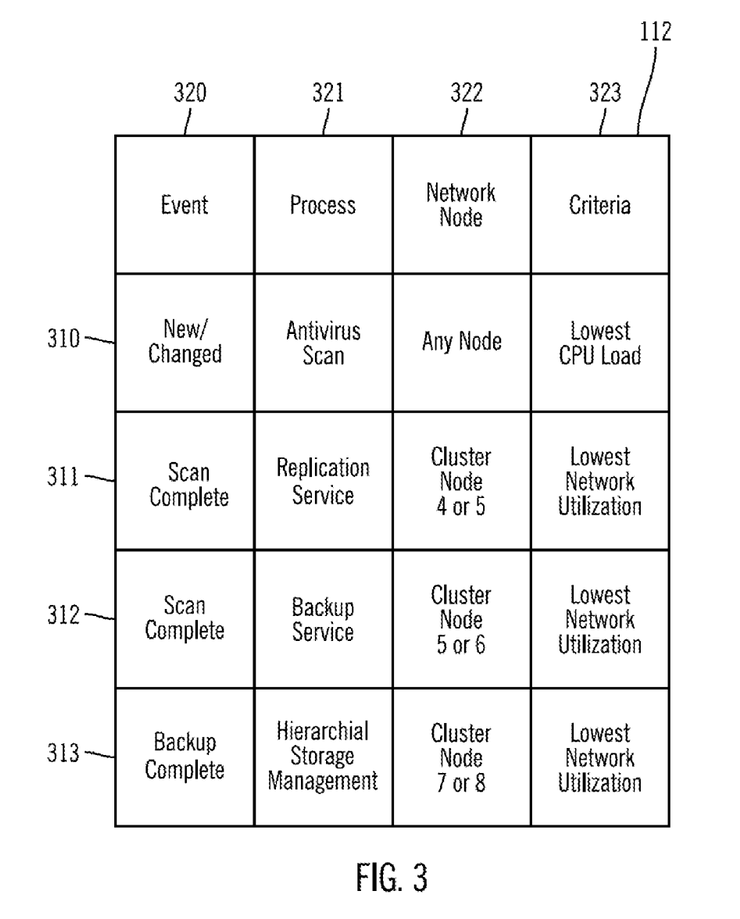
FIG. 3 illustrates an embodiment of a registration database maintained by the data manager.

FIG. 3 conceptually illustrates registration database 112 maintained by the data manager 110 in the described embodiment. Registration database 112 maintains records 310-313. Although four records 310-313 are shown in FIG. 3, registration database may store any number of records limited only by the amount of resources available to maintain the database. Each record 310-313 includes a network event field 320 that identifies a type of network event that may occur, a process field 321 that identifies a process providing a network function to be notified when the type of network event identified in network event field 320 occurs, a network node field 322 that identifies one or more network nodes performing the process identified in process field 321, and a criteria field 324 that identifies criteria for selecting a particular network node from the nodes identified in network node field 322 providing the process that is to receive the notification of an event occurrence. For example, record 310 has a new/change file event type in event field 320, an antivirus scan in process field 321, any node in the network node field 322 indicating the antivirus scan identified process field 321 is on any network node, and lowest CPU load in the criteria field 323 indicating that a network node identified in network node field 322 having a lowest CPU load is to be selected to receive the notification. Based on record 310, an antivirus scan being performed by any node will be notified when a new/change file event occurs. The determination of which node to receive the notification is determined by the node having the lowest CPU load.

Figure 4:
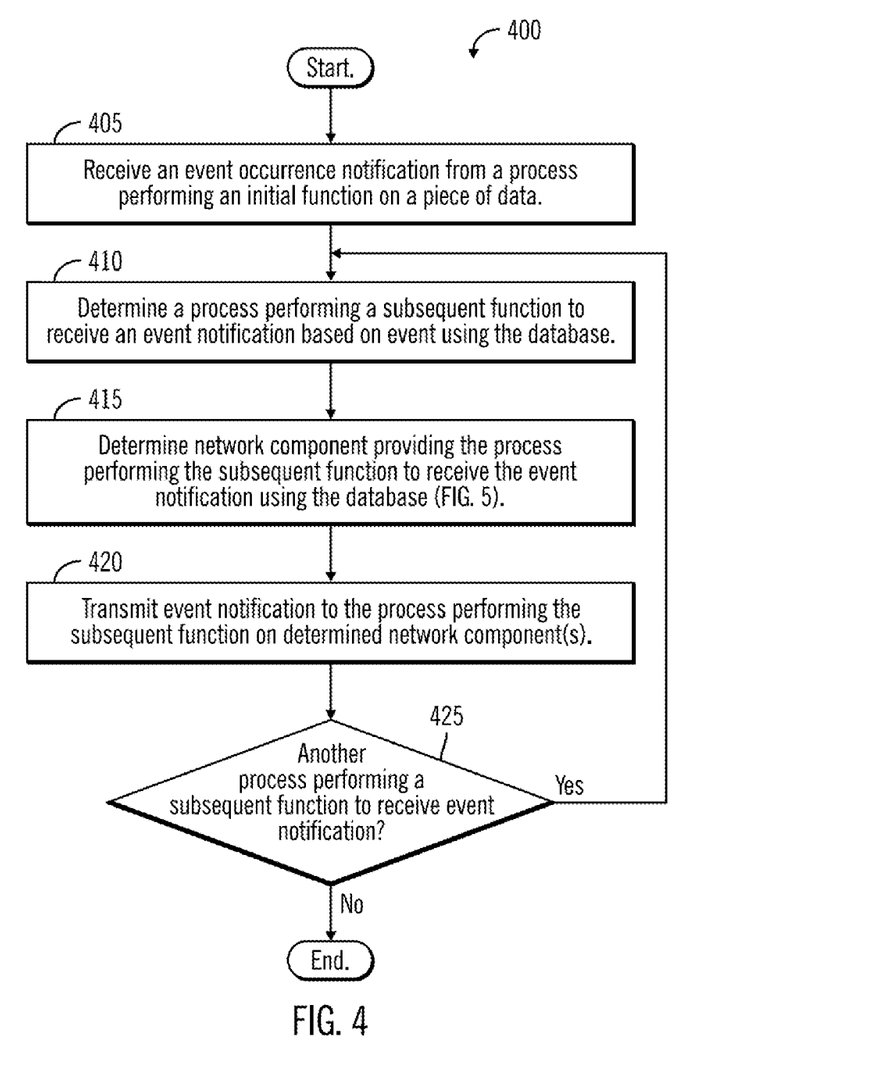
FIG. 4 illustrates an embodiment of operations performed by a data manager to notify registered processes in response to the occurrence of an event.

A process performed by the data manager 110 to provide notification of events in the described embodiment is shown in FIG. 4. Process 400 begins by receiving a notification that a network event 320 has occurred (405). The notification may be message received from one of the process providing a network function, a flag or some other indication in a file, or any other method that may be used by the data manager 110 to determine that a network event has occurred. In the disclosed embodiment, the notification includes the piece of data effected by the event. For purposes of this discussion, the piece of data may be a file, a group of files, an area of memory or any other data structure of organizing data for storage. In various other embodiments, the notification of an event occurrence may include other information including, but not limited to, a first process that originated the notification and/or the network component, such as node, that performed the network function causing the event.

The data manager 110 uses the records 310-313 in the registration database 112 to determine a process 115, 116, 117 that is receive an event notification of the type of event indicated by the notification a network event has occurred (410). The determined process is a second process 115, 116, 117 that is identified in a data record 310-313 as requiring notification when the type of event indicated in the notification has occurred. In response to a process being determined, the data manager 110 uses the registration data base 112 to determine the network component, such as a network node 220, 221, performing the process that is to receive the event notification (415). In the described embodiment, the data manager 112 uses the criteria in the criteria field 323 in the record 310-313 for the event identified in the notification to select one of the network components 220, 221 from the network components in the record. A process for selecting the proper network component 220, 221 is described in more detail with reference to FIG. 5.

An event notification is transmitted from the data manager 110 to the determined process on the determined network component (420). In the described embodiment, the event notification includes an identifier for the piece of data identified in the notification that an event occurred. In some other embodiments, the event notification may also include other information including, but not limited to, identification of the network component, such as a network node 220, 221, and/or the process that caused the identified network event.

After the event notification is transmitted (at 420), the data manager 110 determines whether another or subsequent process 115, 116, 117 is also to receive an event notification for the event that occurred (425). In the described embodiment, the data manager 110 searches the registration database 112 for other records 310-313 that include the identified event that occurred. If a subsequent process 115, 116, 117 is identified, the data manager 110 repeats process 400 from the determination of a process performing a subsequent function (410). Otherwise, process 400 ends.

The above is a description of a process performed by the data manager to notify processes when a network event occurs in accordance with the described embodiment. Other processes that add, combine, and/or remove steps of the described processes are possible in other embodiments.

Figure 5:
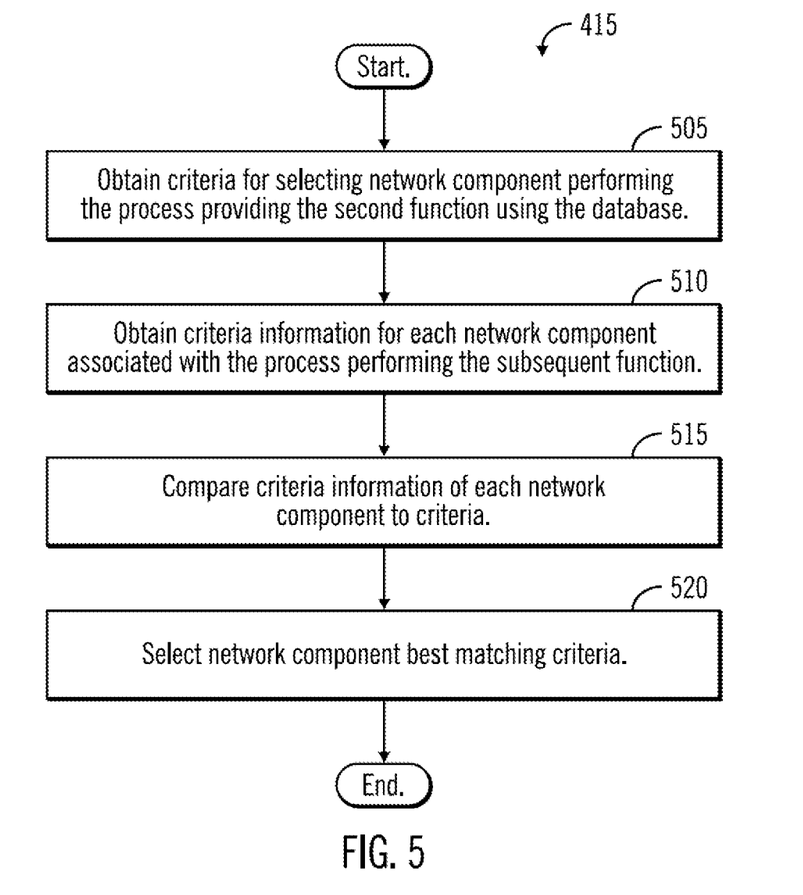
FIG. 5 illustrates an embodiment of operations performed by a data manager to determine a network component providing a registered process to receive an event notification for a registered process.

FIG. 5 illustrates a process performed by a data manager 110 to identify a network component, such as a network node 220, 221, performing a second or identified process 115, 116, 117 to receive the event notification in step 415 of process 400. The data manager 110 obtains the component criteria from the data record 310-313 for the event and determined process (505). The data manager 110 also obtains criteria information for each network component identified 323 in the record 310-313 for the event and the determined process (510). The criteria information may be performance and/or diagnostic information 225, 226 for a network component, such as networks nodes 220, 221, that is available to the data manager 110. In the described embodiment, the obtaining of the criteria information may be performed by requesting and receiving the criteria information from each network component, such as a network node 220, 221, that is identified in the network component field of the record 310-311 for the event that occurred and the determined process. In other embodiments, the criteria information may be obtained from a memory of the storage controller 200 storing the information or in any other manner that is available in the storage system. The criteria information for each network component is compared to the criteria read 323 from the record 310-313 (515). The network component 220, 221 having the criteria information that best matches the criteria is selected as the determined network component (520) and the process ends.

A process for determining a network component performing the determined process to receive an event notification in accordance with the described embodiment is described above with reference to FIG. 5. Other processes that determine the network component that add, combine, and/or remove steps are possible in other embodiments.

Figure 6:
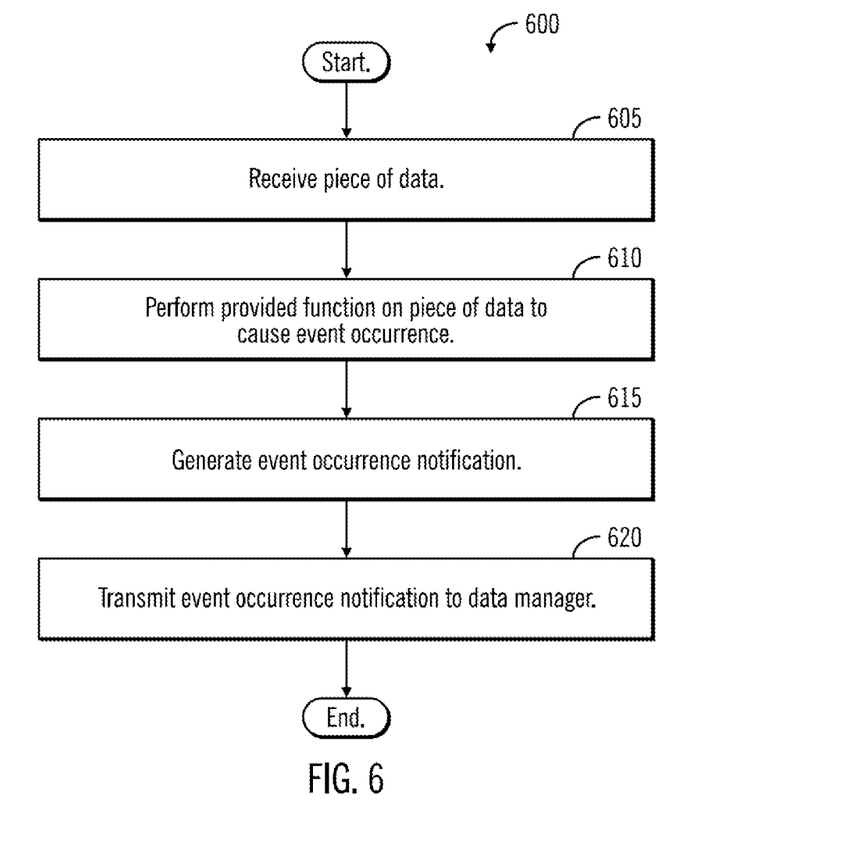
FIG. 6 illustrates an embodiment of operations performed by a process to provide an initial network function causing a network event to send notification of the network event to the data manager.

FIG. 6 illustrates a process performed by a first or initial process that causes the network event to occur to generate an event occurrence notification to send the data manager in the described embodiment. The process obtains the piece of data that is going to be processed (605). The piece of data may be a file, document, directory or any other data structure used to store data. The process then performs the network function provided by the process on the piece of data causing an event (610). For example, a process 215a, 215b performing a virus scan scans the piece of data for possible viruses and performs any other associated function. When the scan is completed, a scan complete event occurs. In response to performing of the function, the process 215a, 215b generates an event occurrence notification (615). In the described embodiment, the event occurrence notification includes an identifier of the piece of data on which the network function was performed. In some other embodiments, the event occurrence notification includes other information including, but not limited to, the network component and/or process 215a, 215b that caused the event. The generated event occurrence notification is then transmitted (620) to the data manager 110 and the process ends.

A process for generating event occurrence notification in the described embodiment is described above with reference to FIG. 6. Other processes that generate an event occurrence notification that add, combine, and/or remove steps are possible in other embodiments.

Figure 7:
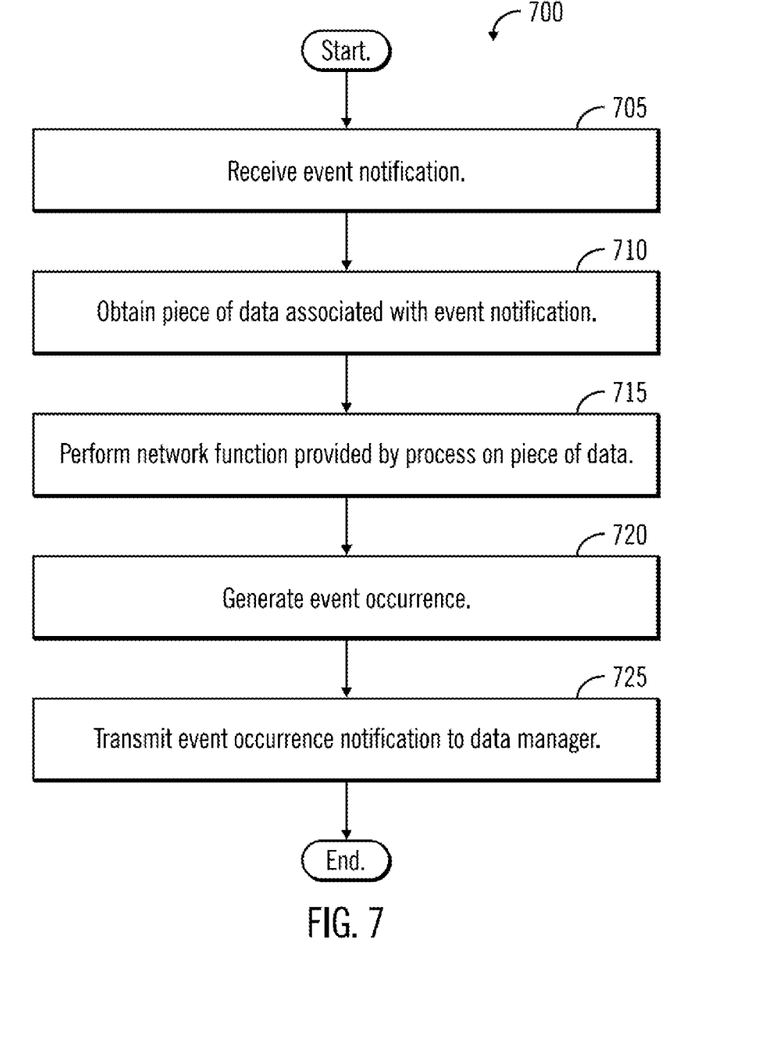
FIG. 7 illustrates an embodiment of operations performed by a process provide a subsequent network function in response to receiving an event notification.

FIG. 7 illustrates a process performed by a second or subsequent process that receives an event notification from the data manager in the described embodiment. The second or subsequent process receives an event notification that a network event has occurred. The process obtains piece of data identified in the received event notification (705). The process obtains the piece of data that is identified in the event notification (710). The process then performs the network function provided by the process on the piece of data causing an event (715). For example, a process 216a, 216b performing backup process copies the piece of data to a second storage location. The piece of data may be a file, document, directory or any other data structure used to store data. When the copy is completed, the backup process 216a, 216b is complete and a backup event has occurred. In response to performing of the function, the process generates an event occurrence notification (720). In the described embodiment, the event occurrence notification includes an identifier of the piece of data on which the network function was performed. In some other embodiments, the event occurrence notification includes other information including, but not limited to, the network component and/or process that caused the event. The generated event occurrence notification is then transmitted to the data manager (725) and the process ends.

A process for performing a network function in response to an event notification in the described embodiment is described above with reference to FIG. 7. Other processes that generate an event occurrence notification that add, combine, and/or remove steps are possible in other embodiments.

Figure 8:
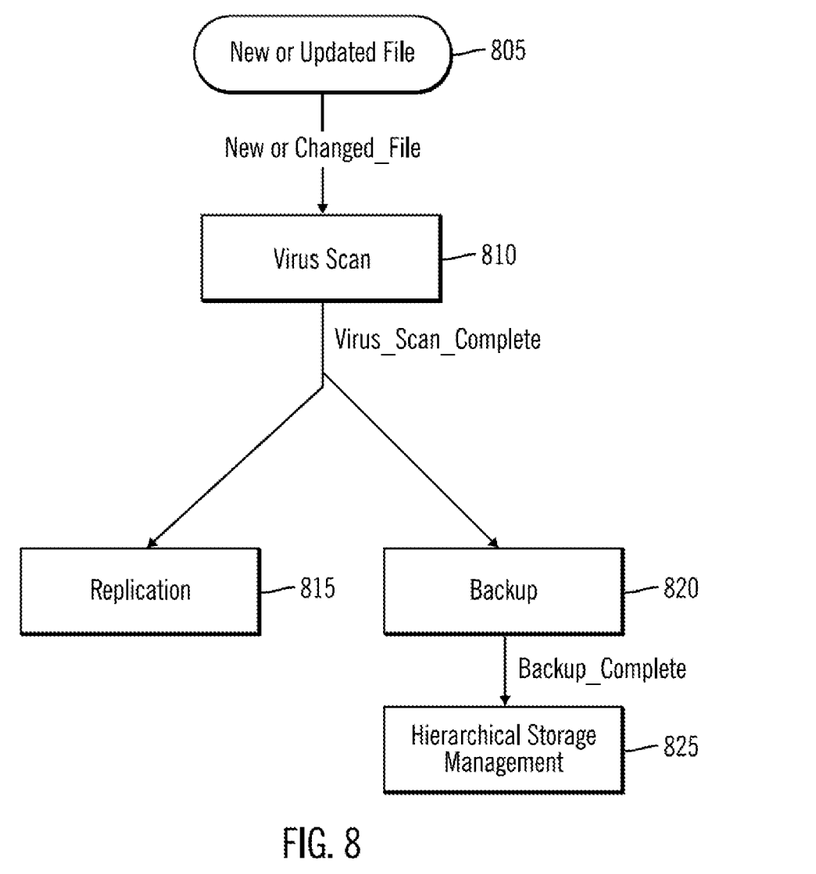
FIG. 8 conceptually illustrates registered processes and the event notifications each process receives in response to occurrences of network events in an embodiment.

FIG. 8 conceptually illustrates a flow diagram of processes providing network function interacting using a data manager 110 in the disclosed embodiment. A new or updated file event occurs (805). The data manager 110 receives a notification of the event and determines that a virus scan process is registered to receive event notifications for a new or updated file event using the registration database 112. The data manager 110 transmits a new or changed file notification to the virus scan 810. In response to the receiving the event notification, the virus scan 810 performs a virus scan on the new or changed file. The virus scan 810 sends a notification of a virus_scan_complete for the file to the data manager. The data manager 110 uses the registration database 112 to determine that a replication process 815 and a backup process 820 are to receive notifications of virus_scan_complete events. The data manager 110 transmits an event notification of the virus_scan_complete event to the replication process 815 and the backup process 820. The replication process 815 then performs a replication function on the file and the backup process 820 performs a backup function on the file. The replication process 815 transmits a replication_complete event notification to data manager and the backup process 820 transmits a backup_complete notification to the data manager 110. The data manager 110 uses the registration database 112 to determine that no processes are to receive a notification of a replication_complete event. The data manager 110 also searches the registration database 112 for process to receive an event notification for the backup_complete process and determines that a hierarchical storage management process 825 is to receive an event notification. The data manager 110 transmits an event notification of the backup_complete event to the hierarchical storage management process 820 that, in turn, stores the file using a hierarchical storage management function.

The above is an example of the interaction of processes performing network functions using a data manager with reference to FIG. 8. It is possible that other interactions may occur in accordance with other embodiments.

Figure 9:
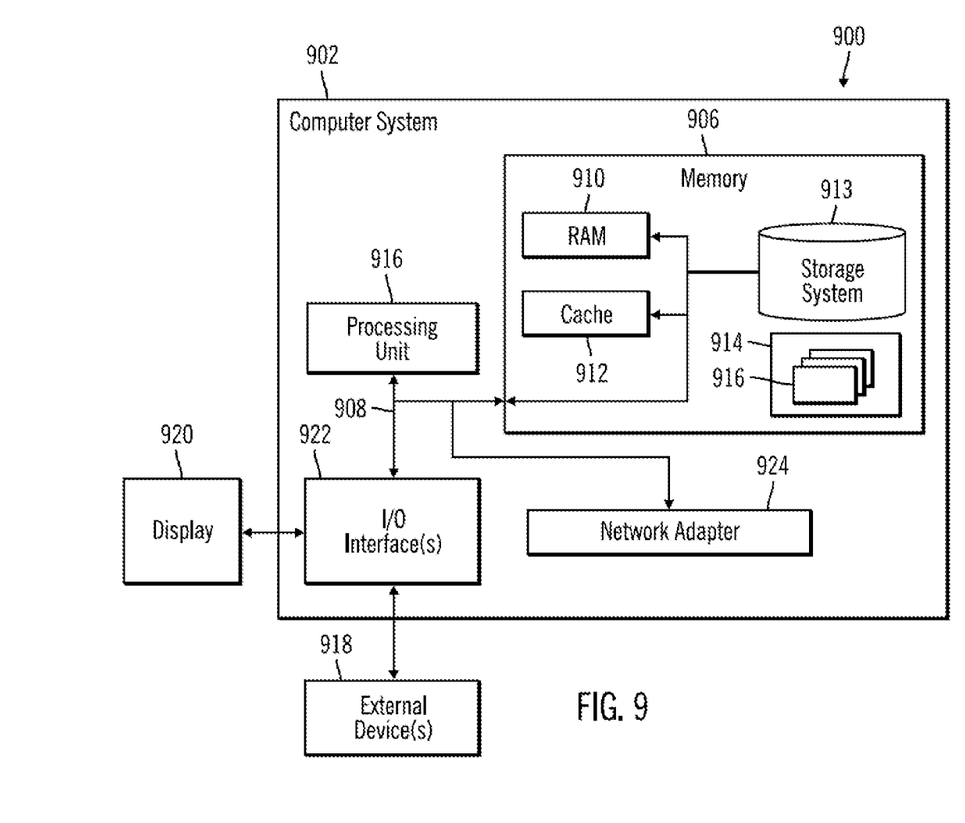
FIG. 9 illustrates an embodiment of a computer system executing instructions to provide a data manager.

FIG. 9 illustrates a computing environment 900 in accordance with certain embodiments. Referring to FIG. 9, computer node 902 is only one example of a suitable computing node and is not intended to suggest any limitation as to the scope of use or functionality of embodiments of the invention described herein. Regardless, computer node 902 is capable of being implemented and/or performing any of the functionality set forth hereinabove.

The computer node 902 may be a computer system, which is operational with numerous other general purpose or special purpose computing system environments or configurations. Examples of well-known computing systems, environments, and/or configurations that may be suitable for use with computer node 902 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 902 may be described in the general context of computer system executable instructions, such as program modules, being executed by a computer system. Generally, program modules may include routines, programs, objects, components, logic, data structures, and so on that perform particular tasks or implement particular abstract data types. Computer node 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer node 902 is shown in the form of a general-purpose computing device. The components of computer node 902 may include, but are not limited to, one or more processors or processing units 904, a system memory 906, and a bus 904 that couples various system components including system memory 528 to one or more processors or processing units 904.

Bus 904 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 902 typically includes a variety of computer system readable media. Such media may be any available media that is accessible by computer node 902, and it includes both volatile and non-volatile media, removable and non-removable media.

System memory 906 can include computer system readable media in the form of volatile memory, such as random access memory (RAM) 910 and/or cache memory 912. Computer node 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, system memory 906 may include at least one program product 914 having a set (e.g., at least one) of program modules 916 that are configured to carry out the functions of embodiments of the invention.

Program/utility 914, having a set (at least one) of program modules 916, may be stored in system memory 906 by way of example, and not limitation, as well as an operating system, one or more application programs, other program modules, and program data.

Each of the operating system, one or more application programs, other program modules, and program data or some combination thereof, may include an implementation of a networking environment. Program modules 916 generally carry out the functions and/or methodologies of embodiments of the invention as described herein.

Computer node 902 may also communicate with one or more external devices 918 such as a keyboard, a pointing device, a display 920, etc.; one or more devices that enable a user to interact with computer node 902; and/or any devices (e.g., network card, modem, etc.) that enable computer node 902 to communicate with one or more other computing devices. Such communication can occur via Input/Output (I/O) interfaces 922. Still yet, computer node 902 can communicate with one or more networks such as a local area network (LAN), a general wide area network (WAN), and/or a public network (e.g., the Internet) via network adapter 924. As depicted, network adapter 924 communicates with the other components of computer node 902 via bus 908. It should be understood that although not shown, other hardware and/or software components could be used in conjunction with computer node 902. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer program product for managing notifications between a plurality of processes providing functions in a data storage system, the computer program product comprising a computer readable storage medium having computer readable program code embodied therein that is executable to perform operations, the operations comprising:
   receiving, from a first process of the plurality of processes, a first event notification of a first event type for a first function performed with respect to data;
   determining an event association indicating a second process of the plurality of processes, a second event notification for the first event type, network nodes that perform the second process, and a criteria to select one of the network nodes that perform the second process in response to receiving the first event notification of the first event type;
   determining a network node of the network nodes indicated in the event association that performs the second process and satisfies the criteria in the event association;
   transmitting the second event notification to the second process on the determined network node to cause the second process to perform a second function with respect to the data subject to the first function and return a third event notification indicative of a second event type for the second function performed with respect to the data; and
   processing the third event notification for the second event type to determine whether to perform further processing with respect to the data.

2. The computer program product of claim 1, wherein a database stores network node associations among a plurality of network nodes and the processes, wherein an association identifies one of the processes and one of the plurality of network nodes that provides the one of the processes, and wherein the determining of the network node to receive the second event notification is performed using the database.

3. The computer program product of claim 1, wherein the determining the network node to receive the second event notification is selected based on a resource utilization at the network node.

4. The computer program product of claim 3, wherein resource utilization criteria are indicated for the network nodes associated with the second process, wherein the determining of the network node to receive the second event notification for the second process comprises determining the network nodes associated with the second process that satisfy the resource utilization criteria indicated for the second process.

5. The computer program product of claim 1, wherein the operations further comprise:
   receiving a request from a new process to register to receive event notifications;
   receiving an indication of each type of notification that the new process is to receive; and adding an event association between the new process and each indicated type of notification the new process is to receive in response to receiving the request.

6. The computer program product of claim 1, wherein the second process comprises a virus scan process and the further processing comprises a backup data process, wherein the virus scan process is performed on the data prior to a backup of the data by the backup data process.

7. The computer program product of claim 1, wherein the processing the third event notification to determine whether to perform further processing comprises:
   determining a fourth event notification for a third process and a fifth event notification for a fourth process for the second event type;
   transmitting the fourth event notification to the third process to perform a third function on the data subject to the first and the second functions; and
   transmitting the fifth event notification to the fourth process to perform a fourth function on the data subject to the first and the second functions.

8. The computer program product of claim 7, wherein the first function comprises an update to or creation of the data and the first event notification comprises notification of the update or creation of the data, wherein the second function comprises a virus scan of the created or updated data and wherein the third event notification indicates the virus scan completed, wherein the third and the fourth functions operations comprise different copy operations performed on the data for which the virus scan was completed.

9. The computer program product of claim 1, wherein the operations further comprise:
   maintaining a database that stores event associations associating processes, event types, event notifications, network nodes performing the processes, and criteria used to select one of the network nodes on which to invoke a process, wherein an event association indicates a process, an event type, an event notification for the event type that the indicated process is to receive, network nodes performing the process, and a criteria used to select one of the network nodes to perform the processes, wherein the processes in multiple of the event associations perform different functions with respect to data for received event notifications for the event associations and wherein the criteria in multiple of the event associations indicate different criteria used to select one of the network nodes associated with the process and event notification to perform the process.

10. A system for managing notifications between a plurality of processes providing functions in a data storage system, comprising:
    a processor;
    a computer readable storage medium including program code executed by the processor to perform operations, the operations comprising:
       receiving, from a first process of the plurality of processes, a first event notification of a first event type for a first function performed with respect to data;
       determining an event association indicating a second process of the plurality of processes, a second event notification for the first event type, network nodes that perform the second process, and a criteria to select one of the network nodes that perform the second process in response to receiving the first event notification of the first event type;
       determining a network node of the network nodes indicated in the event association that performs the second process and satisfies the criteria in the event association;
       transmitting the second event notification to the second process on the determined network node to cause the second process to perform a second function with respect to the data subject to the first function and return a third event notification indicative of a second event type for the second function performed with respect to the data; and
       processing the third event notification for the second event type to determine whether there is a second event association indicating further processing with respect to the data.

11. The system of claim 10, wherein a database stores network node associations among a plurality of network nodes and the processes, wherein a network node association identifies one of the processes and one of the plurality of network nodes that provides the one of the processes, and wherein the determining of the network node to receive the second event notification is performed using the database and wherein the determining the network node from the database to receive the second event notification is selected based on a resource utilization in the network node.

12. The system of claim 11, wherein resource utilization criteria are indicated for the network nodes associated with the second process, wherein the determining of the network node to receive the second event notification for the second process comprises determining the network nodes associated with the second process that satisfy the resource utilization criteria indicated for the second process to receive the second event notification, wherein the operations further comprise:
    receiving a request from a new process to register to receive event notifications;
    receiving an indication of each type of notification that a new process is to receive; and
    adding an event association between the new process and each indicated type of notification the new process is to receive to the database in response to receiving the request.

13. The system of claim 10, wherein the second process comprises a virus scan process and the further processing comprises a backup data process, wherein the virus scan process is performed on the data prior to a backup of the data by the backup data process.

14. The system of claim 10, wherein the processing the third event notification to determine whether to perform further processing comprises:
    determining a fourth event notification for a third process and a fifth event notification for a fourth process for the second event type;
    transmitting the fourth event notification to the third process to perform a third function on the data subject to the first and the second functions; and
    transmitting the fifth event notification to the fourth process to perform a fourth function on the data subject to the first and the second functions.

15. The system of claim 14, wherein the first function comprises an update to or creation of the data and the first event notification comprises notification of the update or creation of the data, wherein the second function comprises a virus scan of the created or updated data and wherein the third event notification indicates the virus scan completed, wherein the third and the fourth functions operations comprise different copy operations performed on the data for which the virus scan was completed.

16. The system of claim 10, wherein the operations further comprise:
maintaining a database that stores event associations associating processes, event types, event notifications, network nodes performing the processes, and criteria used to select one of the network nodes on which to invoke a process, wherein an event association indicates a process, an event type, an event notification for the event type that the indicated process is to receive, network nodes performing the process, and a criteria used to select one of the network nodes to perform the processes, wherein the processes in multiple of the event associations perform different functions with respect to data for received event notifications for the event associations and wherein the criteria in multiple of the event associations indicate different criteria used to select one of the network nodes associated with the process and event notification to perform the process.

17. A method for managing notifications between a plurality of processes providing functions in a data storage system, comprising:
receiving, from a first process of the plurality of processes, a first event notification of a first event type for a first function performed with respect to data;
determining an event association indicating a second process of the plurality of processes, a second event notification for the first event type, network nodes that perform the second process, and a criteria to select one of the network nodes that perform the second process in response to receiving the first event notification of the first event type;
determining a network node of the network nodes indicated in the event association that performs the second process and satisfies the criteria in the event association;
transmitting the second event notification to the second process on the determined network node to cause the second process to perform a second function with respect to the data subject to the first function and return a third event notification indicative of a second event type for the second function performed with respect to the data; and
processing the third event notification for the second event type to determine whether there is a second event association indicating further processing with respect to the data.

18. The method of claim 17, wherein a database stores network node associations among a plurality of network nodes and the plurality of processes, wherein an association identifies one of the plurality of processes and one of the plurality of network nodes that provides the one of the plurality of processes, and wherein the determining of the network node to receive the second event notification is performed using the database and wherein the determining the network node from the database to receive the second event notification is selected based on a resource utilization in the network node.

19. The method of claim 18, wherein a resource utilization criteria are indicated for the network nodes associated with the second process, wherein the determining of the network node to receive the second event notification for the second process comprises determining the network nodes associated with the second process that satisfy the resource utilization criteria indicated for the second process to receive the second event notification, further comprising:
receiving a request from a new process to register to receive event notifications;
receiving an indication of each type of notification that a new process is to receive; and
adding an event association between the new process and each indicated type of notification the new process is to receive to the database in response to receiving the request.

20. The method of claim 17, wherein the second process comprises a virus scan process and the further processing comprises a backup data process, wherein the virus scan process is performed on the data prior to a backup of the data by the backup data process.

21. The method of claim 17, wherein the processing the third event notification to determine whether to perform further processing comprises:
determining a fourth event notification for a third process and a fifth event notification for a fourth process for the second event type;
transmitting the fourth event notification to the third process to perform a third function on the data subject to the first and the second functions; and
transmitting the fifth event notification to the fourth process to perform a fourth function on the data subject to the first and the second functions.

22. The method of claim 21, wherein the first function comprises an update to or creation of the data and the first event notification comprises notification of the update or creation of the data, wherein the second function comprises a virus scan of the created or updated data and wherein the third event notification indicates the virus scan completed, wherein the third and the fourth functions operations comprise different copy operations performed on the data for which the virus scan was completed.

23. The method of claim 17, further comprising:
maintaining a database that stores event associations associating processes, event types, event notifications, network nodes performing the processes, and criteria used to select one of the network nodes on which to invoke the process, wherein an event association indicates a process, an event type, an event notification for the event type that the indicated process is to receive, network nodes performing the process, and a criteria used to select one of the network nodes to perform the processes, wherein the processes in multiple of the event associations perform different functions with respect to data for received event notifications for the event associations and wherein the criteria in multiple of the event associations indicate different criteria used to select one of the network nodes associated with the process and event notification to perform the process.

* * * * *